W. K. PORTER.
COASTER WAGON AND SLED.
APPLICATION FILED JUNE 30, 1920.
1,401,640.
Patented Dec. 27, 1921.
4 SHEETS—SHEET 1.
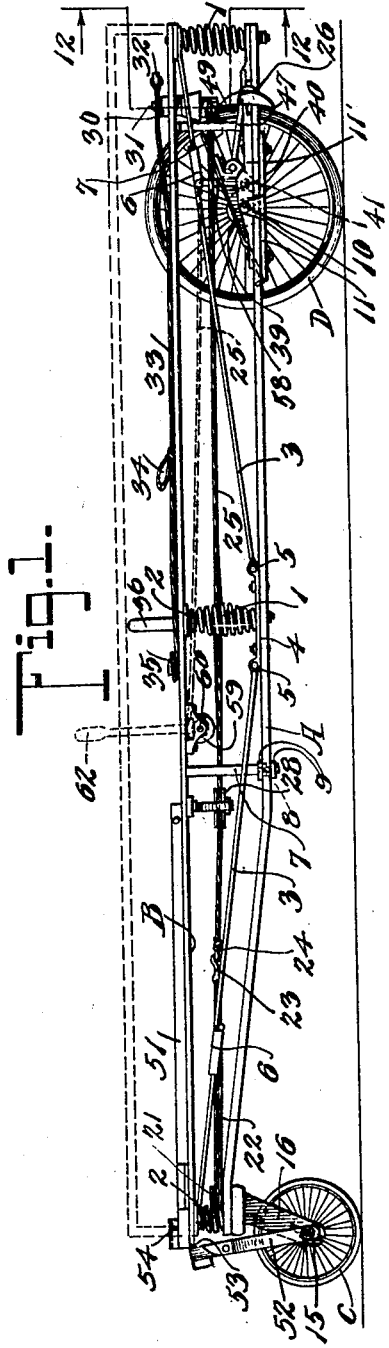
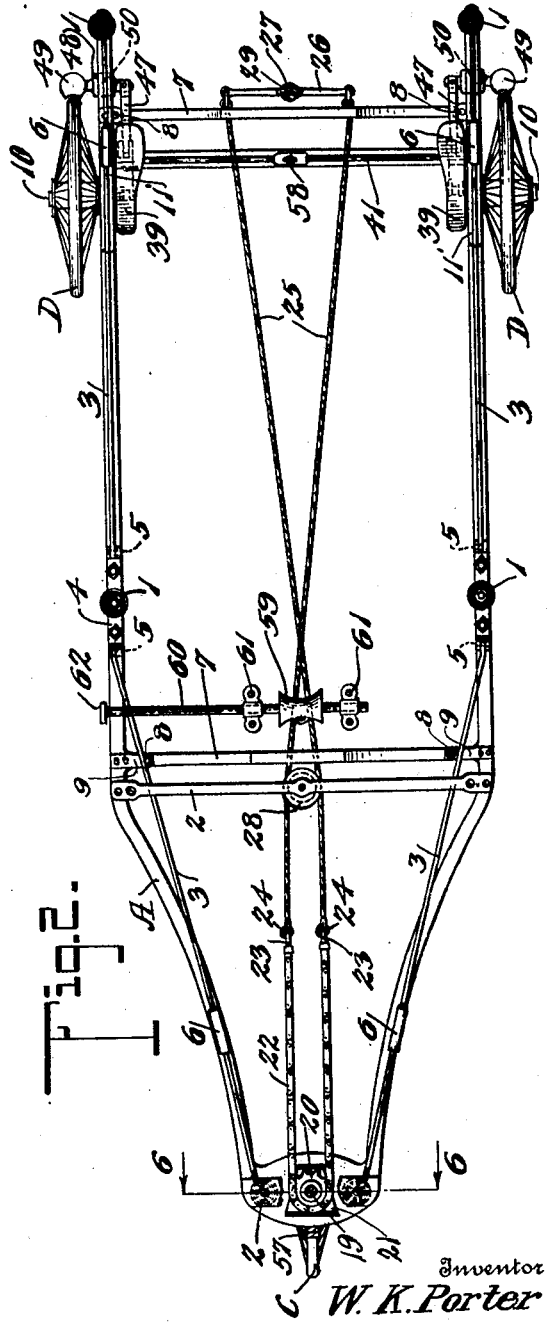
Inventor
W. K. Porter

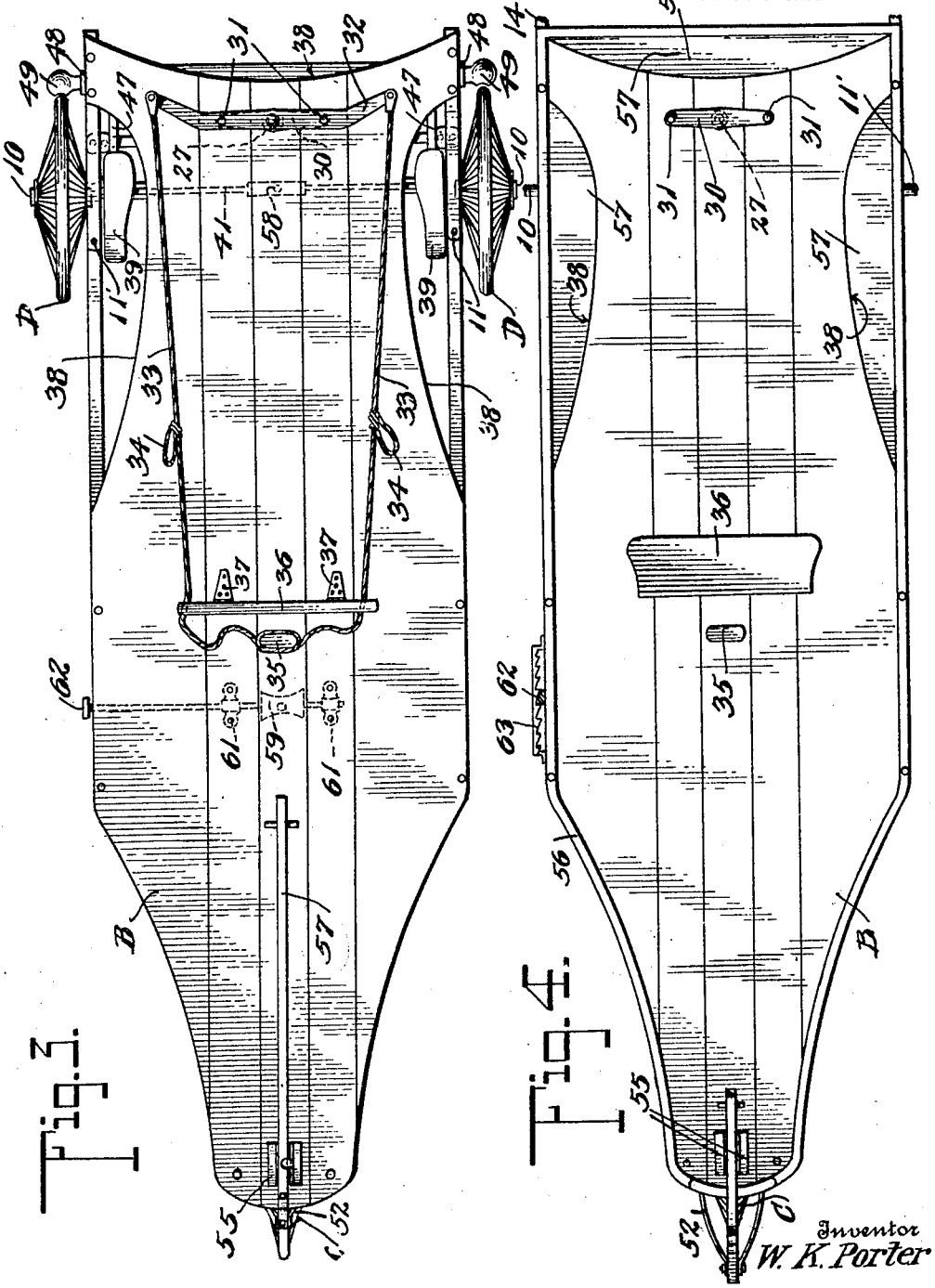

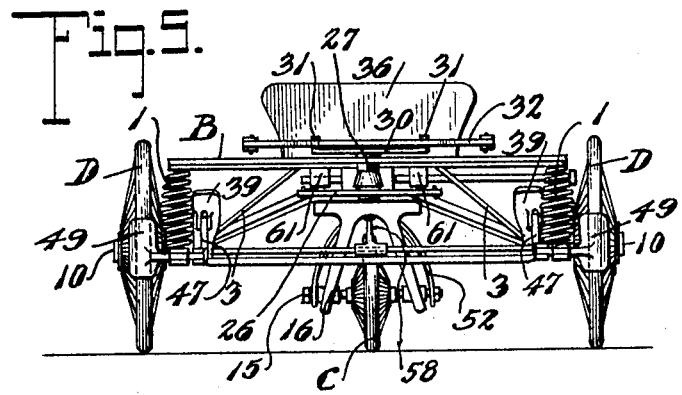
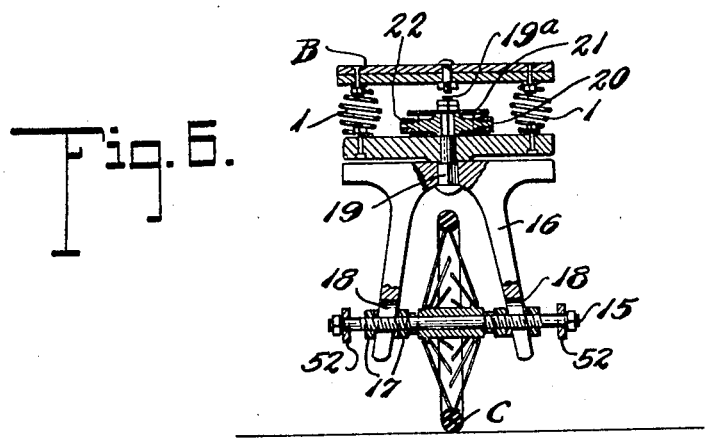
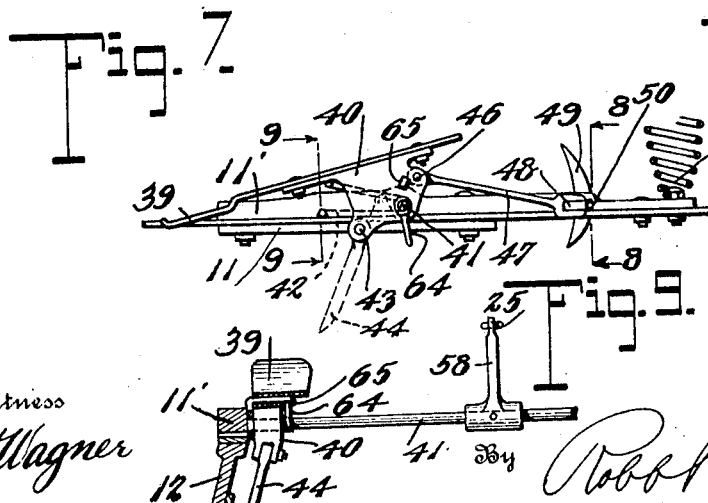

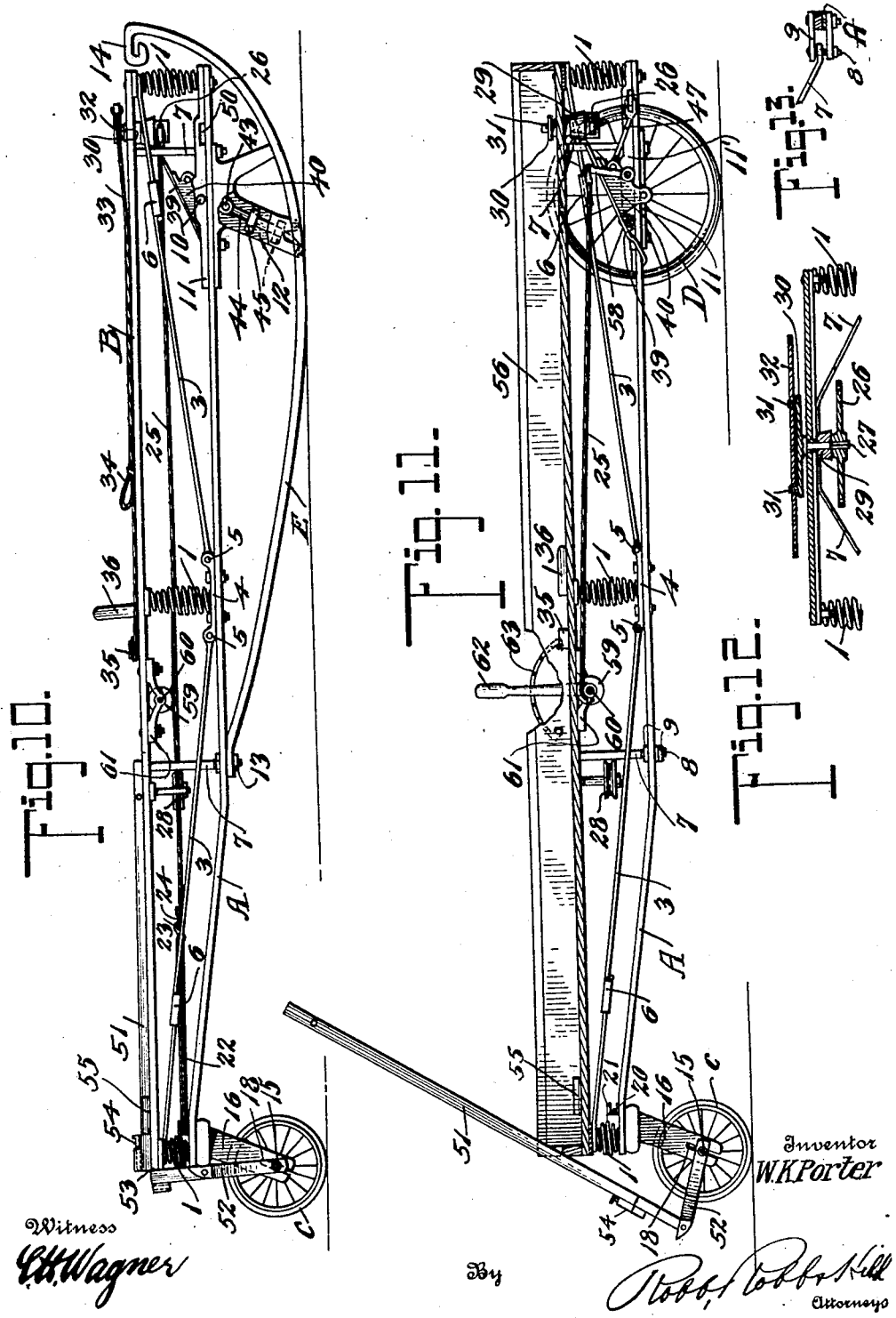

UNITED STATES PATENT OFFICE.

WILLIAM K. PORTER, OF PITTSBURGH, PENNSYLVANIA.

COASTER WAGON AND SLED.

1,401,640.   Specification of Letters Patent.   Patented Dec. 27, 1921.

Application filed June 30, 1920. Serial No. 392,984.

*To all whom it may concern:*

Be it known that I, WILLIAM K. PORTER, a citizen of the United States, residing at Pittsburgh, in the county of Allegheny, and State of Pennsylvania, have invented certain new and useful Improvements in Coaster Wagons and Sleds, of which the following is a specification.

The present invention relates to a convertible sled and wheeled vehicle, and has for its object to provide a device of this character which embodies novel features of construction whereby runners or wheels can be used interchangeably with each other.

Further objects of the invention are to provide a convertible vehicle of this character which is always under the control of the operator and can be used with safety for coasting, and which will ride easily and smoothly.

With these and other objects in view which will more fully appear as the description proceeds, the invention consists in certain combinations and arrangements of the parts, the novel features thereof being pointed out in the appended claims.

For a full understanding of the invention reference is to be had to the following description and accompanying drawings in which:—

Figure 1 is a side elevation of a combination vehicle constructed in accordance with the invention, showing the same as assembled for use as a wheeled vehicle, the sides of the body being indicated by dotted lines.

Fig. 2 is a top plan view thereof with the body board removed to show the lower frame.

Fig. 3 is a top plan view of the device when assembled and adjusted for use as a wheeled coaster.

Fig. 4 is a similar view showing the arrangement which is utilized when the device is to be used as an express wagon.

Fig. 5 is a front view of the device.

Fig. 6 is a sectional view on the line 6—6 of Fig. 2, looking in the direction of the arrows.

Fig. 7 is an enlarged detail view of one of the treadle controlled brake devices.

Fig. 8 is a transverse sectional view on the line 8—8 of Fig. 7, looking in the direction of the arrows.

Fig. 9 is a similar view on the line 9—9 of Fig. 7, looking in the direction of the arrows.

Fig. 10 is a side elevation of the device when assembled for use as a coasting sled.

Fig. 11 is a side elevation of the device when assembled for use as an express wagon, portions being broken away and shown in section to illustrate more clearly the details of construction.

Fig. 12 is a transverse sectional view on the line 12—12 of Fig. 1, looking in the direction of the arrows, and showing certain details of the steering mechanism.

Fig. 13 is a fragmental view of a portion of frame showing means for connecting the transversely disposed arches to the frame.

Corresponding and like parts are referred to in the following description and indicated in all of the views of the drawings by like reference characters.

Specifically describing the particular embodiment of the invention illustrated by the drawings, the reference character A designates a skeleton lower frame which is preferably tapered at one end. Arranged above the skeleton frame A is the bottom board B which is yieldably supported by the six coil springs 1. These springs 1 are shown as having the lower ends thereof secured to the skeleton frame A, while the upper ends thereof are secured to cross pieces 2 applied to the lower face of the bottom board B. The two ends of the bottom board are connected by the links 3 to plates 4 which are secured to the middle portion of the skeleton frame A, said links being pivoted to the plates at 5, and being formed in sections which are connected at 6 to have a limited telescoping movement, thereby enabling the bottom board to have an up and down movement upon the coil springs 1 but holding it against excessive longitudinal play. The bottom board B is also secured to the crown or middle portion of a pair of transversely disposed arched braces 7 which preferably have a spring action, the ends of the braces terminating in eyes which are mounted to slide up and down on vertical bolts 8 carried by small brackets 9 on the sides of the skeleton frame. The body board B is thus held against both longitudinal and transverse movement although it is free to play up and down as the coil springs 1 upon which it is mounted function.

One end of the frame is mounted upon a caster wheel C which is adapted to be manipulated to steer the vehicle. The other end of the frame may be supported by a pair of main wheels D, as indicated by Figs. 1 and 2, or by sled runners E, as indicated by Fig. 10, the wheels and sled runners being interchangeable with each other. The main wheels D are journaled upon stub shafts 10 projecting from brackets 11 which are bolted to the sides of the skeleton frame A. These main wheels D can be removed and the sled runners E placed in position. Intermediate portions of the sled runners are secured to the arms of forked brackets or standards 12 which project downwardly from the skeleton frame. When the vehicle is used as an express wagon the end having the caster wheel is the front end but when it is used as a coaster wagon or sled the opposite end becomes the front end. The rear ends of the sled runners are inclined upwardly and bolted at 13 to the skeleton frame, while the forward ends thereof are curved upwardly at the front of the frame and terminate in the L shaped flanges 14. The forked brackets 12 for the sled runners are detachably bolted to the skeleton frame A and are removed with the runners when the runners are detached.

The caster wheel C is journaled upon a shaft 15 which is adjustable up and down in the slotted arms of a fork 16. Nuts 17 which are threaded upon the shaft can be tightened against the arms of the fork to hold the shaft in an adjusted position within the slots 18, thereby enabling the wheel to be adjusted within the fork to raise or lower the corresponding end of the vehicle. The upper end of the fork 16 is provided with a vertical stem 19 which extends through and is journaled in the end of the skeleton frame A, said stem constituting the axis upon which the fork turns when the caster wheel is manipulated to steer the vehicle. This stem 19 is shown as removable from the fork, the middle portion of the stem which is journaled in the frame A being cylindrical in shape, while the end portions of the stem are polygonal in cross section. The lower polygonal end of the stem engages the fork 16, while the upper polygonal end thereof engages a sprocket wheel 20 which is arranged just above the skeleton frame A. A short extension 19ᵃ at the upper end of the stem 19 extends through the top plate of a casing 21 which fits over the sprocket 20, said casing being secured to the skeleton frame A and serving to brace the vertical stem 19 of the caster wheel fork. The casing 21 is open at both sides to provide the necessary clearance openings for a sprocket chain 22 which passes around the sprocket 20. The extremities of this sprocket chain are connected by snap fasteners 23 to rings 24 at the ends of cables 25 which extend forwardly to a lower cross bar 26 on a steering shaft 27. The two cables 25 engage opposite sides of a guide wheel or pulley 28 and cross each other so that the steering device can be manipulated in the customary manner when it is desired to change the direction of movement of the vehicle.

The steering shaft 27 is vertically disposed and extends upwardly through the body board B, being suitably journaled within bearings 29. The upper end of the steering shaft 27 terminates in a cross head 30 (see Fig. 12) having studs 31 at the opposite ends thereof, said studs being adapted to engage openings in an upper cross bar 32 which is removably held in position thereby. The ends of a steering cable 33 are connected to the upper cross bar 32. The cable 33 may be provided with suitable hand loops 34, and any surplus length of the cable may be wound upon a post 35 arranged at the rear of a back rest 36. This back rest 36 is hinged at 37 to the body board B and may be swung downwardly against the same when not in use, as indicated by Fig. 4. With this construction it will be obvious that the operator or driver will seat himself upon the body board B with his back against the back rest 36 and grasp the hand loops 34 of the steering cable 33 in order to direct the movements of the vehicle and turn it to the right or to the left as may be desired.

By reference to Fig. 3 it will be observed that the sides of the body board B are cut away at 38 to provide clearance spaces which enable the operator or driver to place his feet upon the treadles or foot plates 39 (see Figs. 7, 8 and 9). The foot plates 39 are rigid with blocks 40 which are loose upon opposite ends of a transverse shaft 41, the ends of the shaft being received within brackets 11 bolted to frame A. Springs 42 surround the shaft 41 and each spring has one end thereof secured to the frame, while the other end thereof bears against the foot plate 39 in such a manner as to resist the depression of the foot plate when pressure is applied thereto. The blocks 40 may be connected by pivoted pins 43 to downwardly extending plungers 44 which are adapted to be projected below the sled runners to act as brakes when the runners E are in position. These plungers 44 pass loosely through guides 45 projecting from the inner sides of the brackets 12 which are utilized to secure the sled runners in position. The blocks 40 are also adapted to be connected by pivot pins 46 to brake arms 47 which are rigidly connected to slides 48 carrying brake shoes 49 which are adapted to engage the wheels D. The slides 48 are shown as mounted within slots 50 in the ends of the brackets 11. It will be obvious that when either foot plate 39 is depressed the rocking movement imparted to the block 40 will pull rearwardly upon the arm 47 and bring the corresponding brake shoe 49 into engagement with the wheel D. The two foot plates 39 may be operated either simultaneously or independently of each other. For a purely braking action the two foot plates will be operated simultaneously although when it is desired to assist the caster wheel in steering and to make a quick turn the brakes may be operated independently of each other. This is true whether the wheels D or the sled runners E are in position. The sled brakes 44 are disconnected and removed when the wheels D are used, and the brake arms 47 and shoes 49 are disconnected and removed when the sled runners E are used. Both sets of brakes, however, are arranged to be connected to operate by the foot plates 39.

When the device is used as an express wagon or coaster a tongue 51 is applied to the caster wheel fork 16. The hounds 52 of the tongue are adapted to be detachably mounted upon the ends of the caster wheel shaft 15, as indicated by reference to Fig. 6, and the tongue is formed in sections which are hinged at 53. A suitable bolt 54 may be provided for locking the two hinged sections of the tongue in alinement when it is not desired to fold the tongue over the top of the device in the manner indicated by Fig. 1. When the tongue is thus folded against the body board B it is preferably positioned between a pair of blocks 55. The tongue can be readily detached when it is not desired to use the same. With the tongue 51 in position the device can be readily used as an express wagon, and for this purpose side boards 56 may be provided for application to the edges of the body board B. (See Fig. 4). These side boards 56 are provided at their lower edges with suitable wing pieces 57 to close the openings which would otherwise be provided in the bottom of the body by the cut away edge portions of the body board B. When the device is used as an express wagon the upper cross bar 32 of the steering device is removed, together with the steering cable 33, and the sprocket chain 22 and cables 25 are also removed. One of the cables 25 may have one end thereof connected to a crank arm 58 at the middle of the transverse shaft 41 upon which the brake mechanism is mounted, and the other end thereof secured to a reel 59 on a transverse shaft 60 which extends under the body board B and is journaled in suitable bearings 61. A handle 62 is secured to one end of the transverse shaft 60 and a conventional rack 63 is provided for engagement with the handle to lock it in an adjusted position. By suitably swinging this handle or lever the cable can be wound upon the reel 59 and the transverse shaft 41 rotated to cause pins 64 thereon to engage and rotate the blocks 40 of the foot plates 39. These pins 64 which project laterally from the shaft are swung into inoperative position when the device is used as a coaster and the brakes are applied by the foot plates 39. However, when the device is used as an express wagon and the crank arm 58 of the shaft 41 is connected by a cable to the reel 59, the pins 64 are brought into engagement with shoulders 65 on the blocks 40 so that when the shaft is rotated the blocks 40 will be moved to bring the brake shoes into engagement with the wheels. The same brakes are utilized although they are controlled from a different source.

The parts can be readily interchanged, as will be apparent from the foregoing description to permit of the device being used as a sled, coaster wagon or express wagon. The device can be steered with facility in either direction, and when the steering and brake means are used in conjunction a change in direction in long graceful curves or an abrupt or complete turn can be made when desired. This feature will add greatly to the pleasure of coasting and will also be of assistance in preventing collisions and coasting accidents.

Having thus described the invention, what I claim as new and desire to secure by Letters Patent is:—

1. In a vehicle, the combination with a lower frame, of a superposed body member, springs between the frame and body member, and arched brace members connected to one of the members and having a sliding connection with the other member to hold the body member against lateral displacement.

2. In a vehicle, the combination with a lower frame, of a superposed body member, springs between the frame and body member, transverse arched braces carried by the body member and having a vertical sliding connection with the lower frame, and inclined links connecting the body member to the lower frame, said links and arched brace members holding the body member against lateral or longitudinal displacement relative to the frame.

3. In a convertible sled and wheeled vehicle, a main frame, interchangeable sled runners and wheels, a superposed body member, springs between said frame and body member, and brace means connecting said frame and body member to hold said body member against lateral or longitudinal displacement relative to said frame while permitting relative vertical movements of said body member and frame.

4. A convertible vehicle of the character described, comprising a main frame, brackets secured to one side of said frame adjacent one end thereof, axle members carried by said brackets, wheels adapted to be mounted on said axle members, curved sled runners adapted to have their rear ends attached to said frame at points intermediate the ends of said frame and to bear upon the ground at points near the front end of said frame, and supporting brackets adapted to be connected to said sled runners and to the frame adjacent said wheel supporting brackets.

In testimony whereof I affix my signature.

WILLIAM K. PORTER.